Feb. 1, 1966  G. E. FRANCK  3,232,648
TUBE FITTING
Filed Oct. 11, 1962
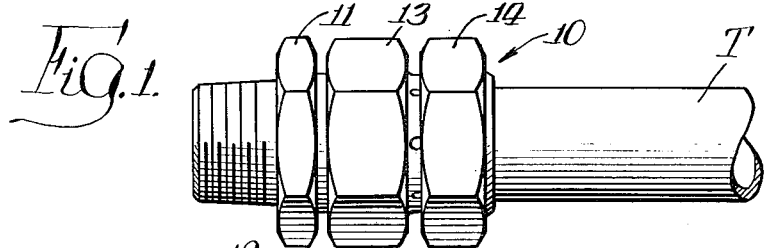
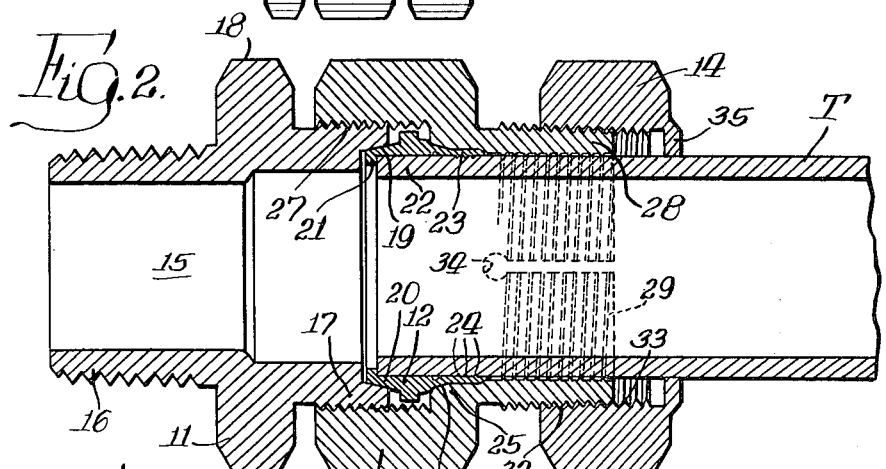
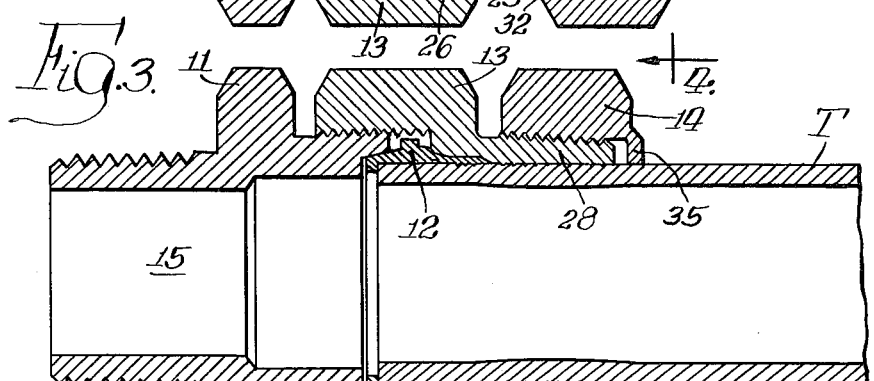
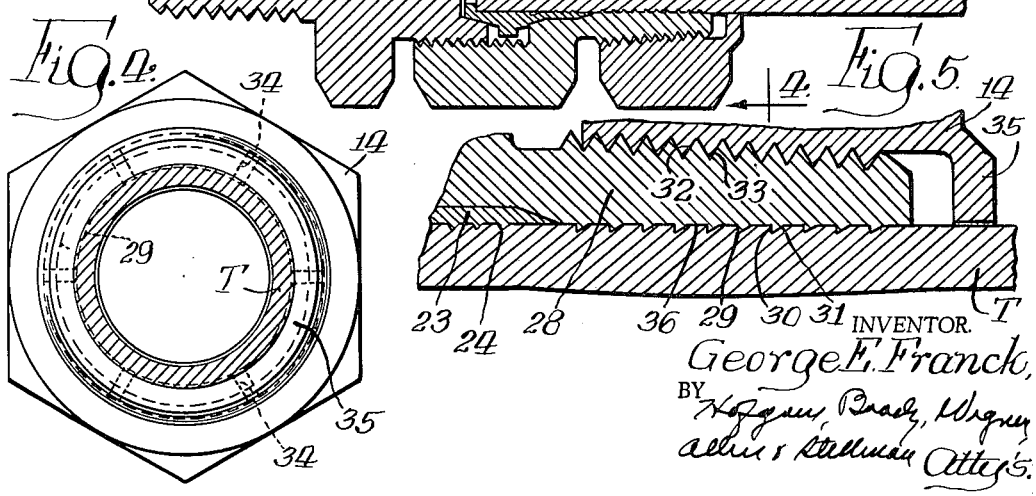
INVENTOR.
George E. Franck,

United States Patent Office 3,232,648
Patented Feb. 1, 1966

3,232,648
TUBE FITTING
George E. Franck, Morton Grove, Ill., assignor to Imperial Eastman Corporation, a corporation of Illinois
Filed Oct. 11, 1962, Ser. No. 229,899
4 Claims. (Cl. 285—322)

This invention relates to tube fittings and in particular to tube fittings for use at high pressures.

In the connection of tubes by means of fittings such as couplings, it is necessary to provide a positive seal between the fitting and the tube end and further to provide means for positively securing the fitting to the tube end. These requirements present serious problems where high pressures are involved as, for example, pressures of 50,000 p.s.i. and over. An excellent fitting for use in coupling tubes is that disclosed in pending U.S. patent application Serial No. 61,023, filed October 6, 1960, and now abandoned by Robert F. Davis and owned by the assignee hereof. The present invention comprehends a modification of the fitting of said application providing positive sealing and retention of the fitting relative to the tube end even at such high pressures.

Thus, a principal object of the present invention is the provision of a new and improved tube fitting.

Another object of the invention is the provision of such a tube fitting arranged for effective positive sealed retention of the tube fitting on the tube end at extremely high pressures.

A further object of the invention is the provision of such a tube fitting having an improved nut member providing positive retaining means.

Other features and advantages of the invention will be apparent from the following description taken in connection with the accompanying drawing wherein:

FIGURE 1 is an elevation of a tube fitting embodying the invention;

FIGURE 2 is an enlarged diametric section thereof at an intermediate stage of the make-up of the fitting;

FIGURE 3 is a diametric section thereof upon completion of the make-up of the fitting;

FIGURE 4 is a transverse section taken substantially along the line 4—4 of FIGURE 5; and FIGURE 5 is a fragmentary, enlarged diametric section illustrating the arrangement of the tube locking means in greater detail.

In the exemplary embodiment of the invention as shown in the drawing, a tube fitting generally designated 10 is shown to comprise a body member 11, a sealing sleeve 12, a first nut member 13, and a second nut member 14. The body member 11 and sleeve 12 are substantially similar to the body member and sleeve member of the above-identified Davis application and reference may be had to that application for a detailed description thereof. Briefly, however, the body member comprises a tubular member having a through bore 15, opening inwardly through an externally threaded inner end 16 and outwardly through an externally threaded outer end 17. The body member may be provided between ends 16 and 17 externally with a plurality of flats 18 for engagement by a suitable tool such as a wrench, in making up the fitting. At the inner end, the bore 15 opens into an enlarged frustoconical recess 19 defining a coaxial inwardly widening seating surface.

The sleeve 12 briefly comprises a tubular member having an outer portion 20 arranged to have facial seating engagement with surface 19 when the sleeve is urged forcibly toward the body 11. The outer portion 20 is provided with an inturned flange 21 against which the end 22 of the tube T abuts. The sleeve 12 further includes an inner constrictible end portion 23 having a plurality of annular sharp ribs 24 which upon constriction of end portion 23 are forced into the tube end 22 thereby effectively sealing the sleeve 12 to the tube end as shown in FIGURE 3.

The constriction of sleeve end portion 23 is effected by the engagement of a cam portion 25 on nut 13 with a cooperating cam surface 26 on sleeve 12, the specific arrangement of the cam portion and cam surface being substantially similar to that of the cam portion and cam surface of the above-identified Davis application to which reference may be had for the details thereof. Longitudinal movement of the nut member 13 to force cam portion 25 against cam surface 26 is effected as an incident of rotation thereof, the nut 13 having an interior thread 27 cooperating with the exteriorly threaded portion 17 of the body member 11. Thus, nut 13 effectively comprises a first force member of the fitting.

As indicated briefly above, at extremely high pressures such as 50,000 p.s.i. or over it is difficult to maintain the tube end fixedly within the fitting. The present invention comprehends the provision of positive retention means effectively precluding such movement, or blowout of the tube from the fitting at such high pressures. More specifically nut member 13 is provided with an outer end portion 28 defined by a cylindrical inner surface 36 having an internal diameter slightly larger than the external diameter of the tube T and provided with an internal thread 29 having a pitch similar to the pitch of the thread 27 of the nut member 13 and a minor diameter substantially equal to the outside diameter of the tube T. The thread 29 comprises a buttress thread having a right triangular section in each axial plane with the inner surface 30 extending substantially perpendicular to the axis and the outer surface 31 extending at an angle such as 45° thereto. The depth of the thread is preselected to have the cylindrical inner surface 36 abut the tube T when the fitting is made-up, thereby providing an automatic "hit-home" indication and controlled penetration of the thread into the tube to preclude excessive deformation of the tube wall. Herein the thread varies from approximately .007" deep in the smaller size fittings to approximately .015" deep in the larger size fittings.

The outer portion 28 of nut member 13 is relatively thin whereby the outer portion may be constricted radially inwardly to cause the thread 29 to be forced into the wall of the tube T as shown in FIGURE 3. The constriction of the end portion 28 herein is effected by a second force member of the fitting, comprising the second nut member 14. For this purpose, the first nut member portion 28 is provided with an external tapered thread 32 and the nut member 14 is provided with a cooperating internal tapered thread 33. The first nut member portion 28 is provided with a plurality of circumferentially spaced, longitudinally extending slots 34 opening through the outer end of the end portion 28 and extending to adjacent the cam portion 25 of the nut member 13.

Nut member 14 is further provided with an inturned flange 35 at its outer end, the internal diameter of the flange 35 being substantially equal to the external diameter of tube T thereby effectively precluding entry of dirt and the like into the made-up fitting at the outer end thereof. As shown in FIGURE 3, the flange 35 is spaced substantially from the outer end 28 of the first nut member in the made-up arrangement of the fitting assuring full constriction of the end portion 28 by the nut member 14.

The fitting is preferably formed of high tensile strength steel so as to accommodate the high pressures involved. Illustratively the fitting may be formed from the high tensile strength steel known as Armco P.H. 4 which may be precipitation heat treated. Such a fitting is capable of use at pressures of over 50,000 p.s.i. in sizes up to and including ½" tube diameters and up to approximately 50,000 p.s.i. in the larger sizes.

The installation of the fitting 10 on the tube T is as follows. The nut member 14 is firstly installed over the end of the tube to the position of FIGURE 2. The nut member 13, sleeve 12 and body member 11 are then installed seriatim as indicated in FIGURE 2 with the sleeve flange 21 abutting the inner end 22 of the tube T. Nut member 13 is then advanced on threaded outer portion 17 of body member 11 to force the sleeve portion 21 into tight sealing engagement with the body member seat 19 and constrict the sleeve portion 23 to cause the ribs 24 thereof to bite into and have tight sealing engagement with the tube end 22.

Nut member 14 is then threaded inwardly on nut member portion 28. The inward threading of the nut member 14, by virtue of the tapered threads 32 and 33, constricts the end portion 28 of nut member 13 thereby pressing the thread 29 firmly into the tube wall. The tube wall may be slightly constricted as shown in FIGURE 3 as a result of the constriction of the nut member portion 28 and the sleeve end portion 23.

As shown in FIGURE 3 the nut member 14 is threaded inwardly to adjacent the cam portion 25 of the first nut member 13 in the made-up arrangement of the fitting. Thus the constrictive action of the nut member 14 is directed also somewhat against the outer end portion 23 of the sleeve 12 whereby a substantially positive engagement of the sleeve end with the tube wall is obtained. Thus an improved sealing and gripping engagement of the tube end by the sleeve is provided which in conjunction with the positive retention of the tube end in the fitting by means of the thread 29 assures a tight sealed association of the fitting 10 with the tube end 22 notwithstanding the presence of extremely high pressures therein.

As the thread 29 has the same pitch as the threaded portion 27 of the nut member 13 the fitting may be disassembled simply by unthreading the nut member 14 and then unthreading the nut member 13 to remove the nut member 13 from association with body member 11. The portion 28 of the nut member 13 merely unthreads on the tube during this unthreading operation of the nut member 13, permitting the nut member 13 to be subsequently re-installed on the tube end in the existing threaded groove formed by the original constriction of the end portion 28 thereinto.

While I have shown and described one embodiment of my invention, it is to be understood that it is capable of many modifications. Changes, therefore, in the construction and arrangement may be made without departing from the spirit and scope of the invention as defined in the appended claims.

I claim:
1. A tube fitting comprising: a body member having a seat surface; an annular sleeve arranged for coaxially receiving the end of a tube having an outer wall portion, said sleeve having an inner end adapted to sealingly engage said seating surface, a constrictible outer end, and sealing means at said outer end of the sleeve for sealing said sleeve to the tube end as an incident of constriction of said outer end; a first force member mounted on said body for axial movement relative thereto and having a cam portion for constricting said sleeve outer end as an incident of movement of said cam portion toward said body; cooperating means on said force member and said body for forcibly urging said force member toward said body; a constrictible element secured to said force member at a region axially removed from said cam portion, said element having thereon radially inwardly extending means arranged for penetration into the outer wall portion of the tube end as an incident of constriction of said element and thereby positively precluding movement of the tube longitudinally outwardly relative to said nut member, said inwardly extending means comprising a cylindrical inner surface in said element and at least one projection extending radially inwardly from said surface and having a preselected radial extent whereby said projection may penetrate into the tube; and a second force member mounted on the assembly of said body and said first force member for axial movement relative to said constrictible element and having means thereon cooperating with said constrictible element to force said at least one projection into the tube thereby to lock the tube against axial movement relative to the fitting.

2. The tube fitting of claim 1 wherein said second force member is threaded on said first force member.

3. The tube fitting of claim 1 wherein said at least one projection includes a substantially radial, axially inner surface.

4. The tube fitting of claim 1 wherein said cylindrical inner surface facially abuts the outer surface of the tube in the made-up arrangement of the fitting thereby providing a hit-home indication of the full penetration of said at least one projection into the tube wall.

References Cited by the Examiner
UNITED STATES PATENTS

| | | | |
|---|---|---|---|
| 652,789 | 7/1900 | Leitelt | 285—169 |
| 1,257,852 | 2/1918 | Hall | 285—322 X |
| 1,735,663 | 11/1929 | Ansel | 285—322 |
| 1,872,536 | 8/1932 | Weatherhead | 285—171 |
| 2,031,825 | 2/1936 | Eastman | 285—243 |
| 2,313,780 | 3/1943 | Snyder | 285—341 X |
| 2,457,648 | 12/1948 | Donner | 285—323 |
| 2,613,959 | 10/1952 | Richardson | 285—382.7 X |
| 2,934,362 | 4/1960 | Frank | 285—341 |

CARL W. TOMLIN, *Primary Examiner.*